United States Patent
Duggan (10) Patent No.: US 7,984,534 B2
(45) Date of Patent: Jul. 26, 2011

(54) CABLE RESTRAINT CLIP

(76) Inventor: Daniel C. Duggan, Chesterfield, MO (US)

( * ) Notice: Subject to any disclaimer, the term of this patent is extended or adjusted under 35 U.S.C. 154(b) by 871 days.

(21) Appl. No.: 11/969,849

(22) Filed: Jan. 4, 2008

(65) Prior Publication Data

US 2008/0163466 A1    Jul. 10, 2008

Related U.S. Application Data (60) Provisional application No. 60/878,598, filed on Jan. 4, 2007.

(51) Int. Cl.
F16L 11/12   (2006.01)

(52) U.S. Cl. .............. 24/115 K; 24/129 R; 52/167.1; 248/342

(58) Field of Classification Search .............. 24/122.3, 24/122.6, 135 R, 129 R, 115 K, 115 R; 403/210; 439/809, 97; 248/58, 65, 342; 52/167.1
See application file for complete search history.

(56) References Cited

U.S. PATENT DOCUMENTS

| | | | |
|---|---|---|---|
| 0,912,387 A | 2/1909 | Landry | |
| 1,380,518 A | 6/1921 | Bellig | |
| 2,643,428 A * | 6/1953 | Jenne | 24/115 K |
| 2,901,798 A * | 9/1959 | Jenne | 24/115 K |
| 3,238,585 A | 3/1966 | Froyd | |
| 3,593,384 A * | 7/1971 | Huggins | 24/115 K |
| 3,930,288 A | 1/1976 | Black et al. | |
| 4,040,589 A | 8/1977 | McLay | |
| 4,630,982 A | 12/1986 | Fenner | |
| 4,676,470 A | 6/1987 | Okura | |
| 5,224,246 A | 7/1993 | Royball | |
| 5,412,843 A | 5/1995 | Krongauz et al. | |
| 5,560,664 A * | 10/1996 | Lotze et al. | 294/89 |
| 6,026,545 A | 2/2000 | Duggan | |
| 6,350,089 B1 | 2/2002 | Tekavec | |
| 6,415,560 B1 | 7/2002 | Rinderer | |
| 6,837,009 B1 | 1/2005 | Roth | |
| 6,848,873 B1 | 2/2005 | Husk | |
| 6,971,623 B2 | 12/2005 | Allmon et al. | |
| 7,044,426 B1 | 5/2006 | Allmon et al. | |
| 7,162,837 B1 | 1/2007 | Roth | |
| 7,341,232 B2 | 3/2008 | Masas | |

* cited by examiner

Primary Examiner — Robert Sandy
(74) Attorney, Agent, or Firm — William B. Ritchie (57) ABSTRACT

A seismic cable restraint clip attaches a seismic brace component, such as a cable, to a building structure. A bolt is typically used to attach the clip to the building structure. The restraint clip is constructed to reduce or eliminate multiplication of force applied from the cable to the bolt through the restraint clip.

9 Claims, 12 Drawing Sheets

PRIOR ART

CABLE RESTRAINT CLIP

FIELD OF THE INVENTION

This invention relates to seismic bracing, namely anchoring braces for concrete building structures which are located in areas that are likely to experience earthquakes.

BACKGROUND OF THE INVENTION

In a typical seismic brace for a pipe, a cable is fastened around the pipe and then anchored to the building concrete structure using a bolt and a restraint clip. When the pipe moves from side to side in an earthquake, the cables pull it back into proper position. Pulling down and to the side on the cable assembly applies a combination of loading of the fastener to the building structure with part of the load in shear forces and the other part in tension forces. This combination loading at an angle to the fastener and geometry of the bracket used results in a prying effect on the fastener. The prying effect varies according to the angle to the fastener at which the load is applied.

Figure 1:
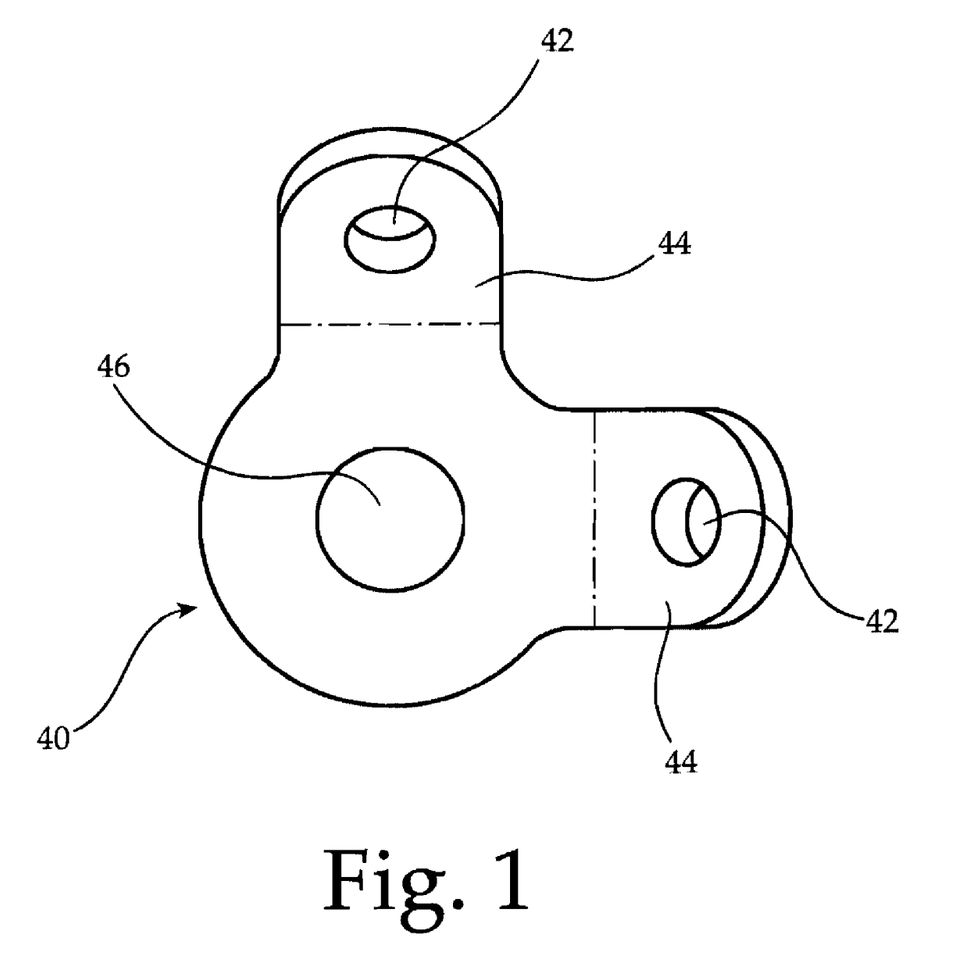
FIG. 1 is an illustration of a typical prior art restraint clip.
Figure 2:
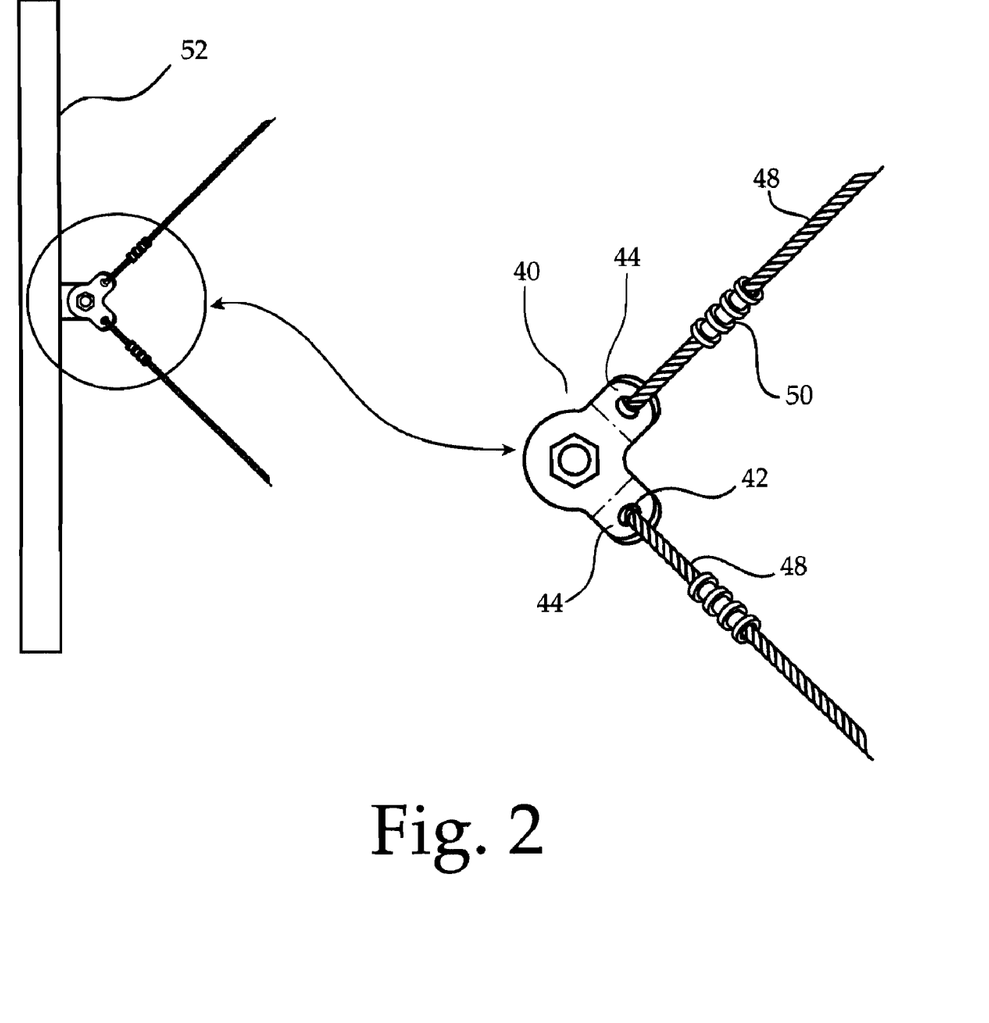
FIG. 2 is an illustration of the typical restraint clip as it is attached for use as a fitting for attachment of bracing to building structure.
Figure 3:
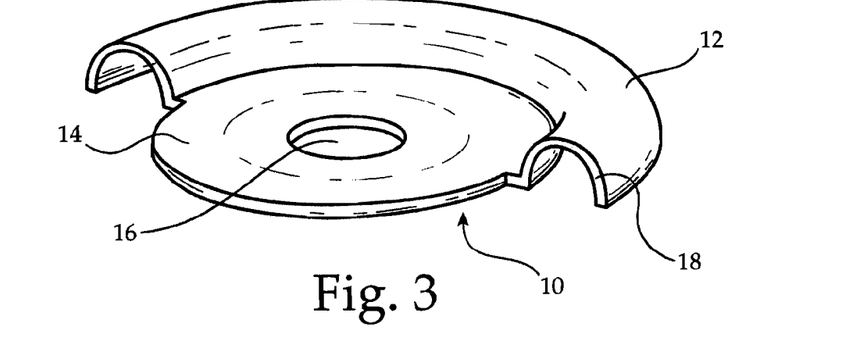
FIG. 3 is an isometric view of a first embodiment of a restraint clip in accordance with the invention.
Figure 4:
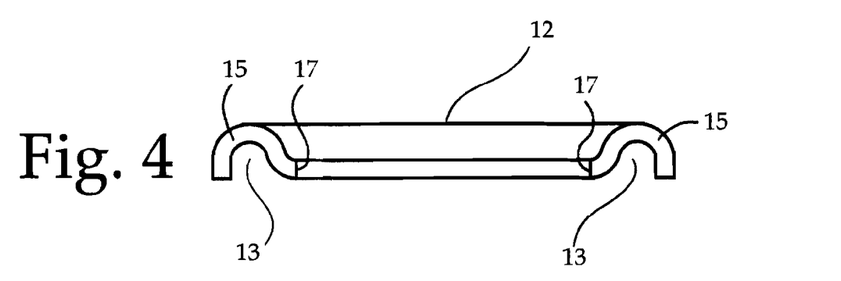
FIG. 4 is a front side view of the restraint clip shown in FIG. 3.
Figures 5, 6:
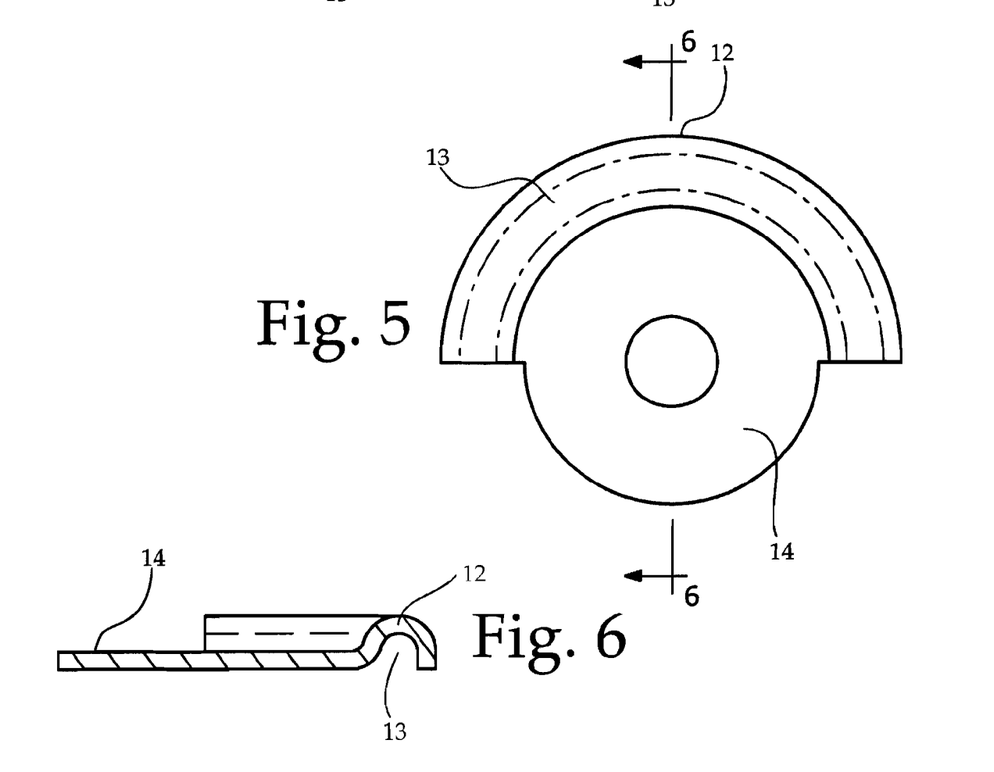
FIG. 5 is a top view.
FIG. 6 is a section taken in the plane including line 6-6 of FIG. 5.

As can be seen in the prior art drawings, FIGS. 1 and 2. The restraint clip 40, shown in detail in FIG. 1, features a hole in its center 46 wherein a bolt or support rod can be placed as shown in FIG. 2. This particular clip device is manufactured by Loos & Co., Inc. of Naples, Fla. 34104.

In this particular restraint clip 40, the seismic cables 48 are attached to two ears 44 typically placed at 90 degree angles to one another and bent upwards from the horizontal as shown. Cables 48 are attached to the ears by a loop that is formed using oval sleeves 50. Pulling on restraint clip 40 by means of the cable 48, restraint clip 40 can be pried loose.

Figure 15:
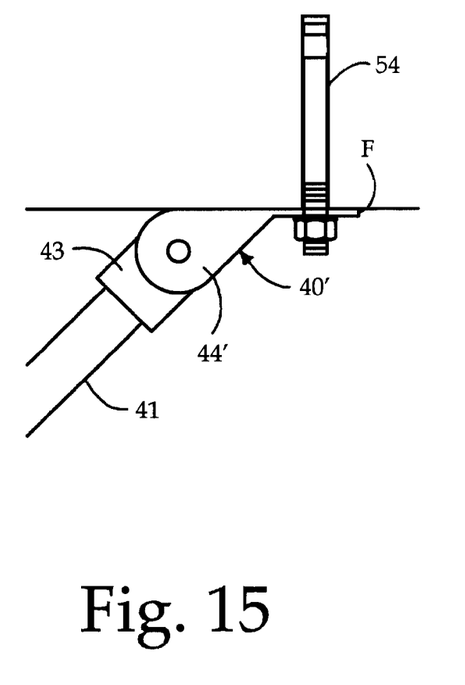
FIG. 15 is an illustration of a cable restraint clip like the restraint clip of FIGS. 1 and 2, but used to attach pipe, angle iron or strut type bracing to a building structure.
Figure 16:
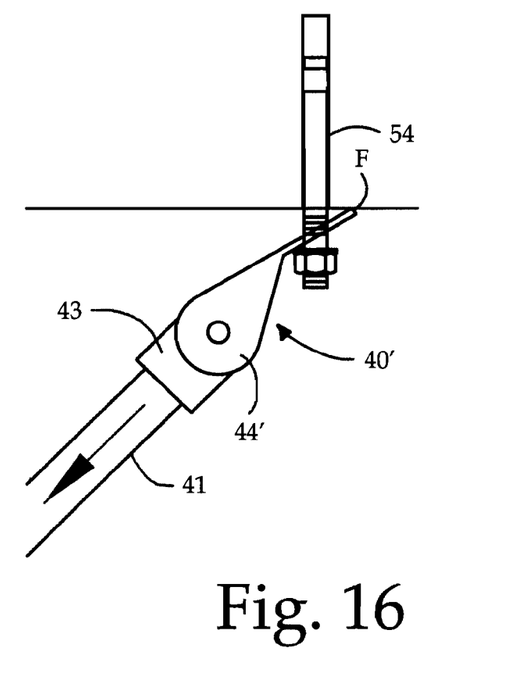
FIG. 16 is an illustration of the prying effect on a typical restraint clip as it is attached for use as a fitting for attachment of pipe, angle iron or strut type bracing to building structure.

FIGS. 15 and 16 show a restraint clip 40' bolted to a concrete structure, but attached to a pipe 41 (or similar rigid article) rather than the cable 48. This particular restraint clip is typical for pipe, angle iron and strut type seismic brace components of other manufacturers. In this particular restraint clip, the seismic brace components are attached to the clip 40' by a hinge element 43 to allow the rigid pipe 41 to assume various different brace angles from vertical. Whether a flexible cable 48 or rigid pipe 41 is used as a brace component, application of force along the length of the brace component can cause the clip 40, 40' to pry the bolt out of the concrete. More particularly, the clip 40, 40' acts as a second class lever. An edge or point F of the clip 40, 40' on the opposite side of the bolt from the ears 44, 44' is the fulcrum. The bolt and the location on the ears 44, 44' where the cable 48 or pipe 41' are connected are both spaced from the fulcrum F on the same side of the fulcrum. Accordingly, the clip 40, 40' multiplies the tension force being applied to the bolt to pry it out as shown more specifically in FIG. 16 with respect to the clip 40'.

As noted above, this is due to the fact that the seismic brace components are not pulling directly parallel or perpendicular to the axis of the anchoring bolt or support rod. Instead, a substantial component of the force applied to the brace components end up as both shear force (i.e., a force that is perpendicular to the axis of the bolts) and tension force (i.e., a force that is parallel to the axis of the bolts). The tension portion of this combined shear and tension loading is increased due to the prying effect of the restraint clip. This increased tension force will cause the restraint clip to be pried loose (See FIG. 15). The greater the angle between the seismic brace and the axis of the bolt holding the restraint clip, the greater the tension force (a force that is coincident with the axis of the bolt). In fact, the inventor has found, in a representative example, that at a 30 degree angle, the horizontal allowable earthquake load (Fps) is only 239 pounds when using a "prying" type of clip and with a first embodiment of the applicant's invention (described hereinafter) the horizontal allowable earthquake load is 689 pounds.

There is not found in the prior art that a cable restraint clip or other seismic brace restraint clip that does not increase the tension load on the anchoring bolt due to the prying effect of the restraint clip geometry in order to eliminate premature failure of the attachment bolt in those situations where the cable, pipe, angle iron or strut type seismic braces are pulling at an angle relative the axis of the attachment bolts or rods.

SUMMARY OF THE INVENTION

In one aspect of the invention, a restraint clip for use in connecting a seismic bracing component to a braced structure generally comprises an attachment flange having a hole therein sized and shaped for receiving a fastener to attach the restraint clip to the braced structure. A rigid connection portion of the restraint clip is rigidly attached to the attachment flange for connecting the bracing component to the attachment flange. The rigid connection portion defines a termination point through which force from the bracing component is applied to the clip. The termination point is located so that the bracing component extends outwardly from the termination point toward a first side of the restraint clip. The termination point lying in or to a second side of the restraint clip opposite of the first side of a plane perpendicular to the attachment flange and intersecting the fastener hole, and the rigid connection portion is free of any termination point lying to the first side of the plane.

BRIEF DESCRIPTION OF THE DRAWINGS

Corresponding reference characters indicate corresponding parts throughout the several views of the drawings.

DETAILED DESCRIPTION OF THE INVENTION

Referring now to FIGS. 3-6, a restraint clip 10 of a first embodiment of the invention is shown. Restraint clip 10 is a single piece of metal that is formed in a suitable manner, such as by stamping from sheet metal. The thickness 18 of the metal plate used to stamp restraint clip 10 is dependent on the cable size that is being held. Thickness 18 in one embodiment is about ⅛ inch thick. This would be sturdy enough to accommodate a size 36 cable which has a breaking strength of approximately 4,300 pounds. The inventor has found that restraint clip 10 was not pried loose in this test but only exhibited a small amount of deformation that was evenly distributed around the bolt. The thickness of the restraint clip would be adjusted accordingly to accommodate heavier or lighter cables.

Figure 9:
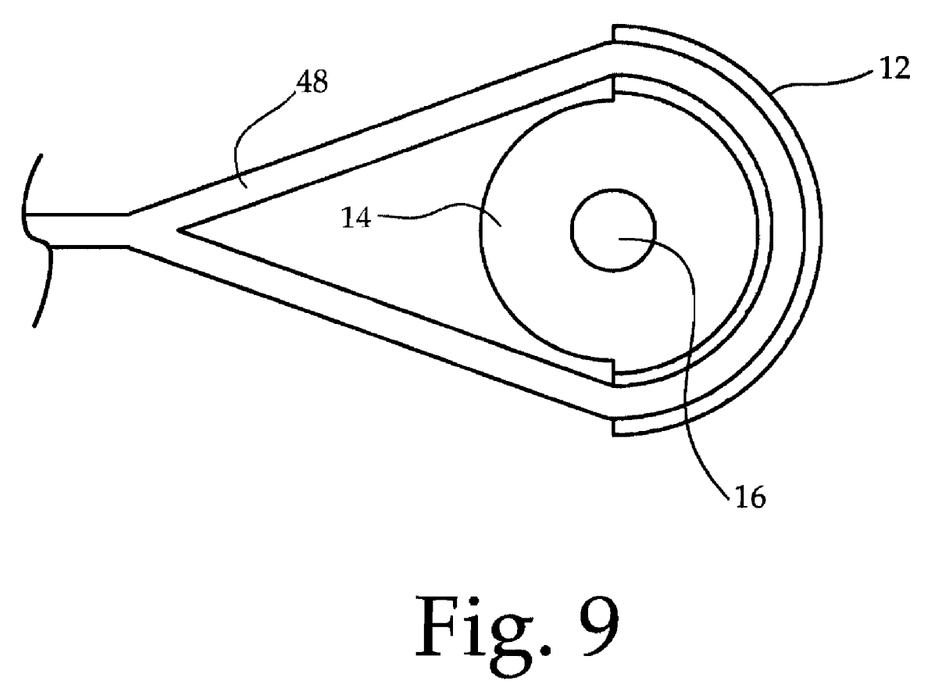
FIG. 9 is a bottom view of the restraint clip showing the cable as held by the clip.

Semi-circular channel 12 extends half-way around circular attachment flange 14 and defines recess 13. The channel 12 is in the illustrated embodiment formed as one piece with the attachment flange, and may be broadly considered as a rigid connection portion. Attachment flange 14 features bolt hole 16 (broadly, "a fastener hole") in its center which is used to attach restraint clip 10 to a concrete (shown in FIG. 7), metal or wood surface of a building structure (broadly, "a braced structure"). A portion of the loop formed in the cable 48 is received in recess 13 and extends around attachment flange 14 and bolt hole 16 (as shown in FIG. 9). The loop in cable 48 can be made using an oval sleeve swaging device 50 such as shown in FIG. 2, or in any other suitable manner.

Figure 7:
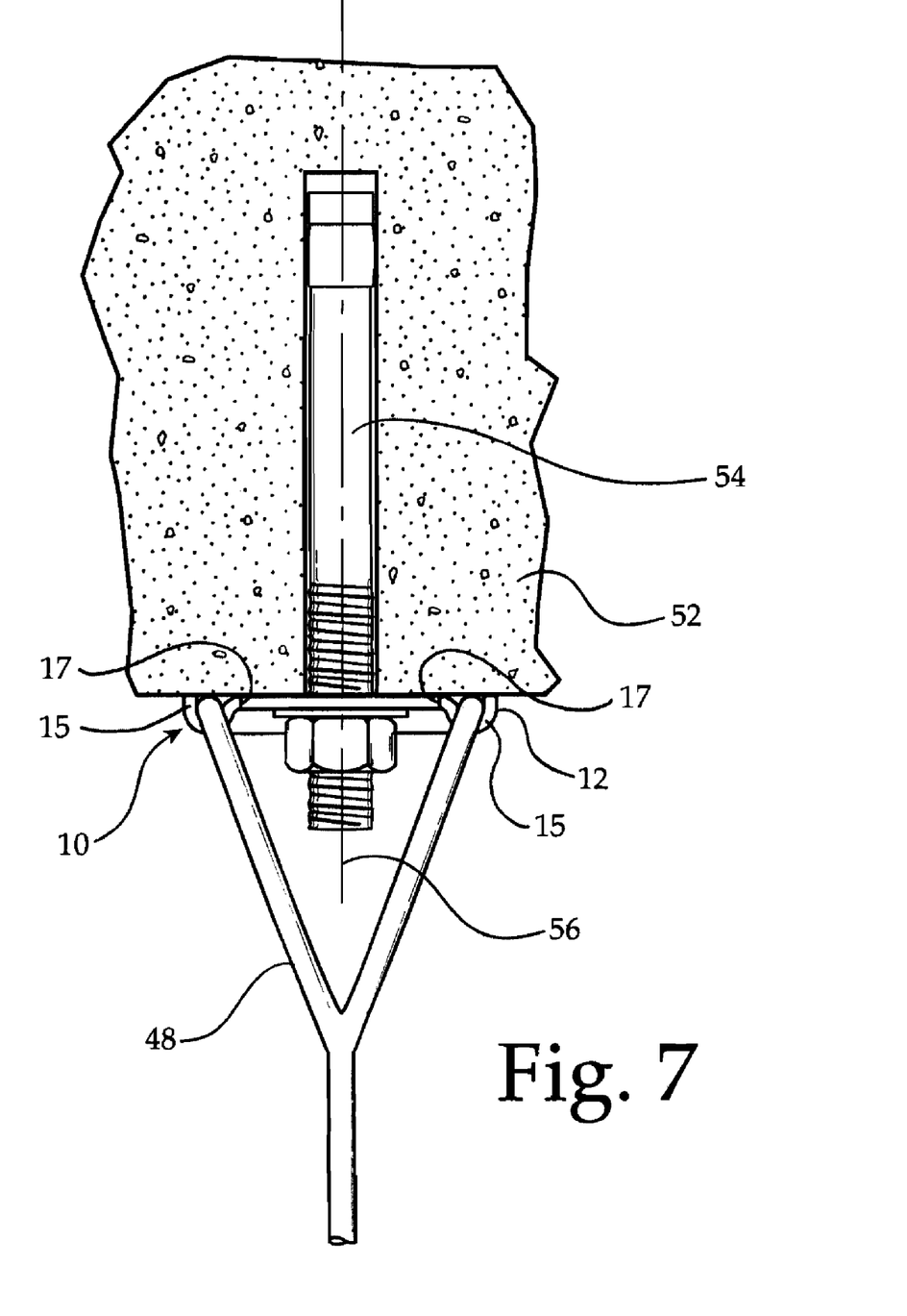
FIG. 7 is an elevation of the restraint clip mounted by a bolt on a concrete building structure broken away to show a shank of the bolt.
Figure 8:
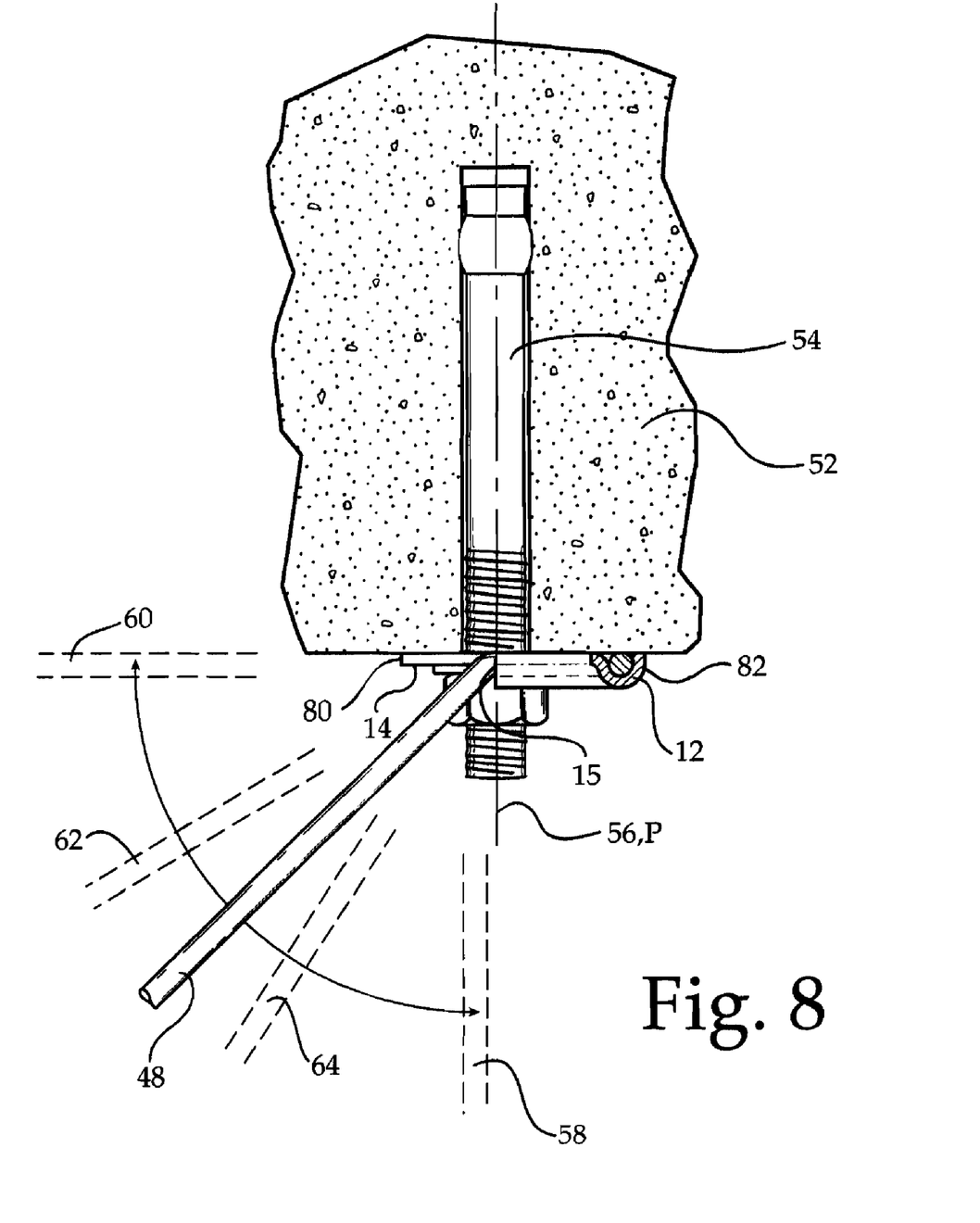
FIG. 8 illustrates the cable attachment at various angles to the concrete structure using the restraint clip, with a fragment of the clip and cable broken away.

Referring now to FIGS. 7-9, bolt 54 (which could also be a rod or other suitable fastener) fastens restraint clip 10 to the surface of concrete 52. Cable 48 is within recess 13 of channel 12 captured between the channel and the concrete surface. Note that cable 48 exits restraint clip 10 so that the connection point is aligned with axis 56 of bolt 54. The connection point lies in terminal surfaces 15 of the channel 12 and defines termination points 17 corresponding to the points of connection between the channel and the attachment flange 14 at the terminal surfaces of the channel through which force is transmitted from the cable 48 to the attachment flange. The terminal surfaces 15 and termination points 17 are located so that the cable 48 extends outwardly from the channel 12 toward a first side 80 of the restraint clip 10. The termination points 17 lie in the plane or to a second side 82 of the restraint clip 10 opposite of the first side 80 of a plane P perpendicular to the attachment flange and intersecting the bolt hole 16. More specifically in the illustrated embodiment the plane P includes the 56 of the bolt 54 and passes through the center of the bolt hole 16.

The cable can be set at various angles 58, 60, 62 and 64 relative to axis 56. If set at angle 58, then substantially all force applied to from cable 48 to the bolt 54 will be in tension. On the other hand, if cable 48 is placed at angle 60, all forces applied to the bolt 54 will be shear. Settings at other angles, shown as 62 and 64 will have both a shear component and a tension component. Restraint clip 10 eliminates the prying effect that multiplies the component of force applied from the cable 48 to the bolt 54 that is in tension thereby substantially reducing tendency of the attachment to be pried loose.

In the preferred embodiment, shown with cable 48 attached, the semi-circular channel 12 cause the legs of the looped cable 48 to act like a pulley to equally share the load. Further, it will naturally orient itself to alignment with the cable 48 to the braced structure. Also, it cannot be easily installed backwards.

Cable 48 is shown pulling at various angles 58, 60, 62 and 64 relative to axis 56 of bolt 54. When cable 48 is set at angles 62 to 64 or any angle in between or immediately adjacent thereto, the forces pulling on cable 48 are resolved to eliminate the prying effect that increases the applied tension that would be found without using restraint clip 10. Thus, the tendency for the attachment to be pried loose is substantially diminished.

Figure 10:
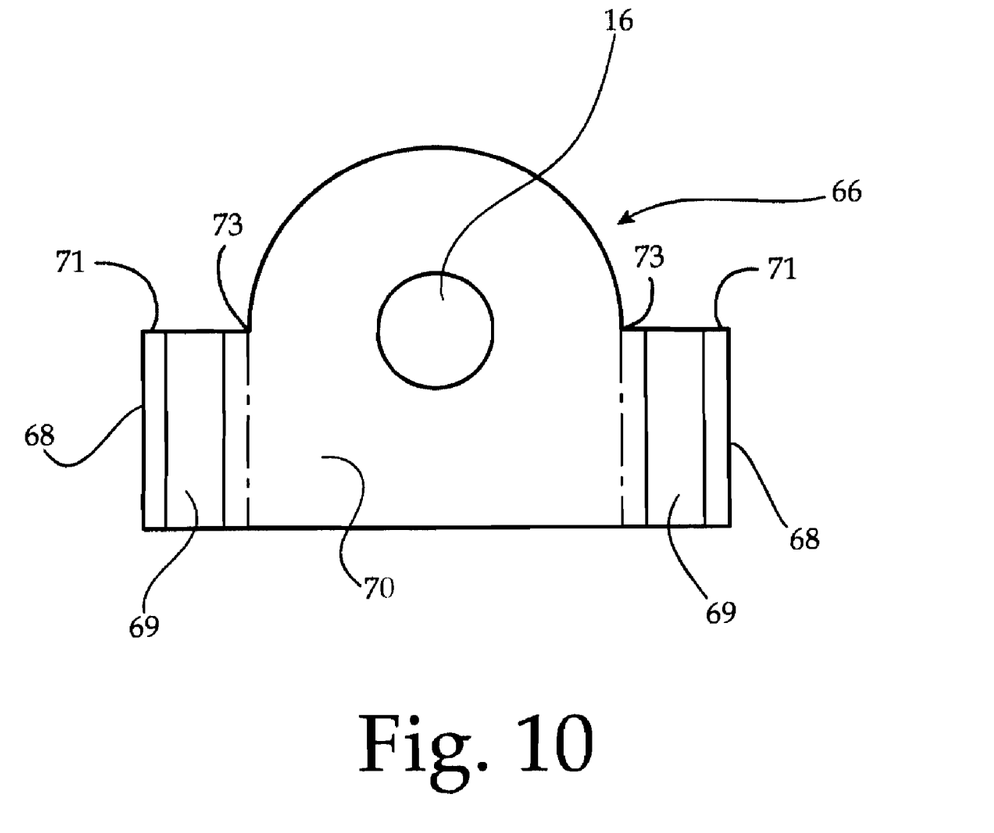
FIG. 10 is a top view of a cable restraint clip of a second embodiment.
Figure 11:
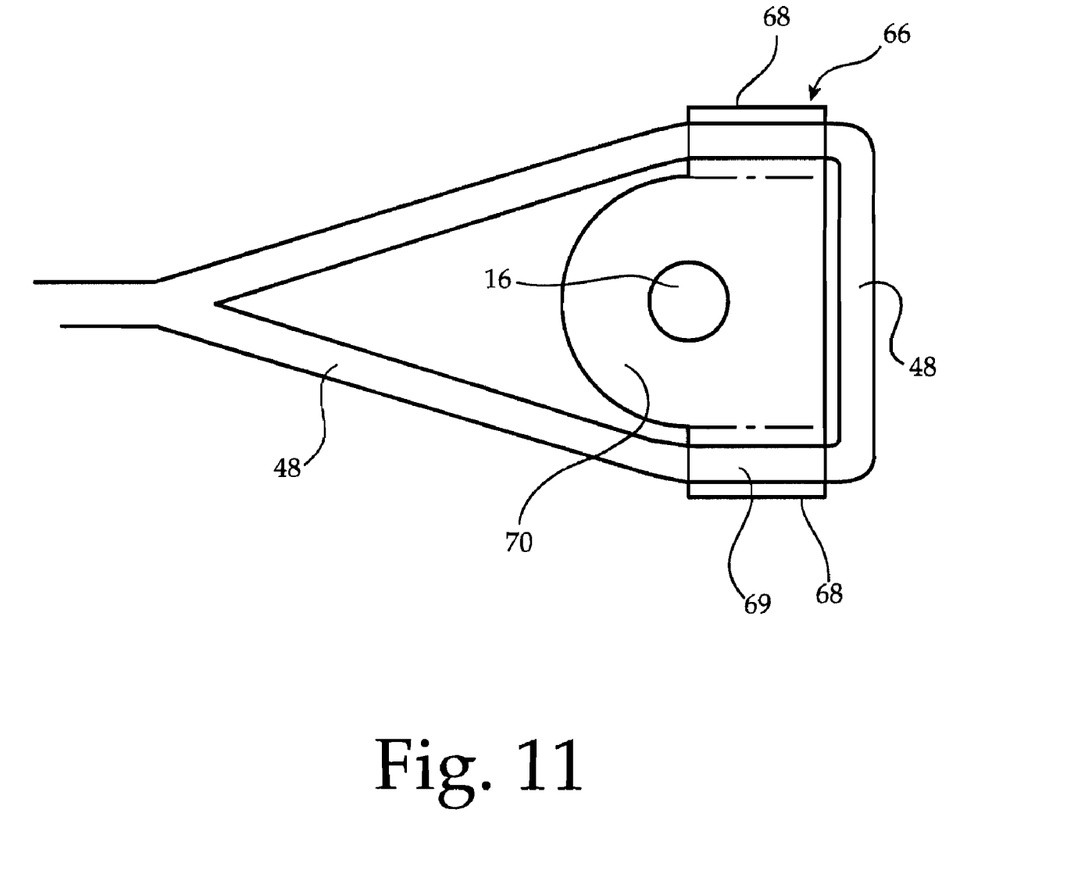
FIG. 11 is a top view of the restraint clip shown in FIG. 10 with a cable attached.

Referring now to FIG. 10, a restraint clip 66 of a third embodiment of the invention is shown. In this embodiment, attachment flange 70 is roughly U-shaped as shown in FIG. 11. The restraint clip 66 includes two, spaced apart channels 68 defining recesses 69 for receiving the cable. Each channel defines a terminal surface 71 and termination or connection point 73 like those (15, 17) of the first embodiment, and are located relative to a plane perpendicular to the attachment flange 70 and passing through the bolt hole 16 in the same configuration as the terminal surface 15 and connection point 17 of the first embodiment. When the cable 48 pulls on clip 66, the U-shaped portion of flange 70 keeps the clip 66 from being pried loose. While this embodiment may be less expensive to manufacture, it could also be, unlike the preferred embodiment, installed backwards. If this were done, the prying elimination effects of the restraint clip would be reduced or eliminated.

Figure 12:
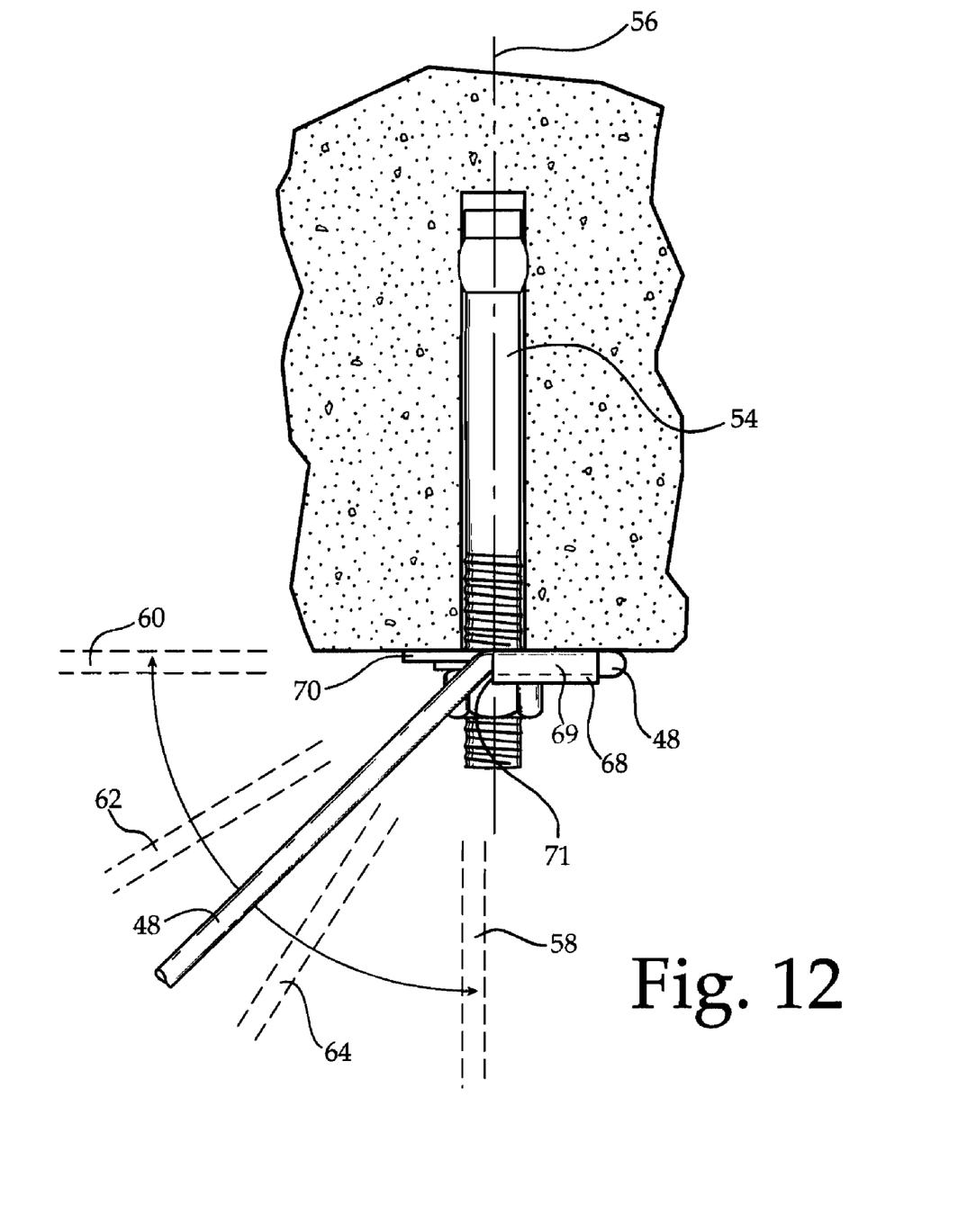
FIG. 12 is a view similar to FIG. 8, but showing the restraint clip of FIG. 10.

FIG. 12 illustrates the various angles that cable 48 could be pulled and have the desired no prying effects achieved, also, as shown in FIG. 8 for the first embodiment.

Figure 13:
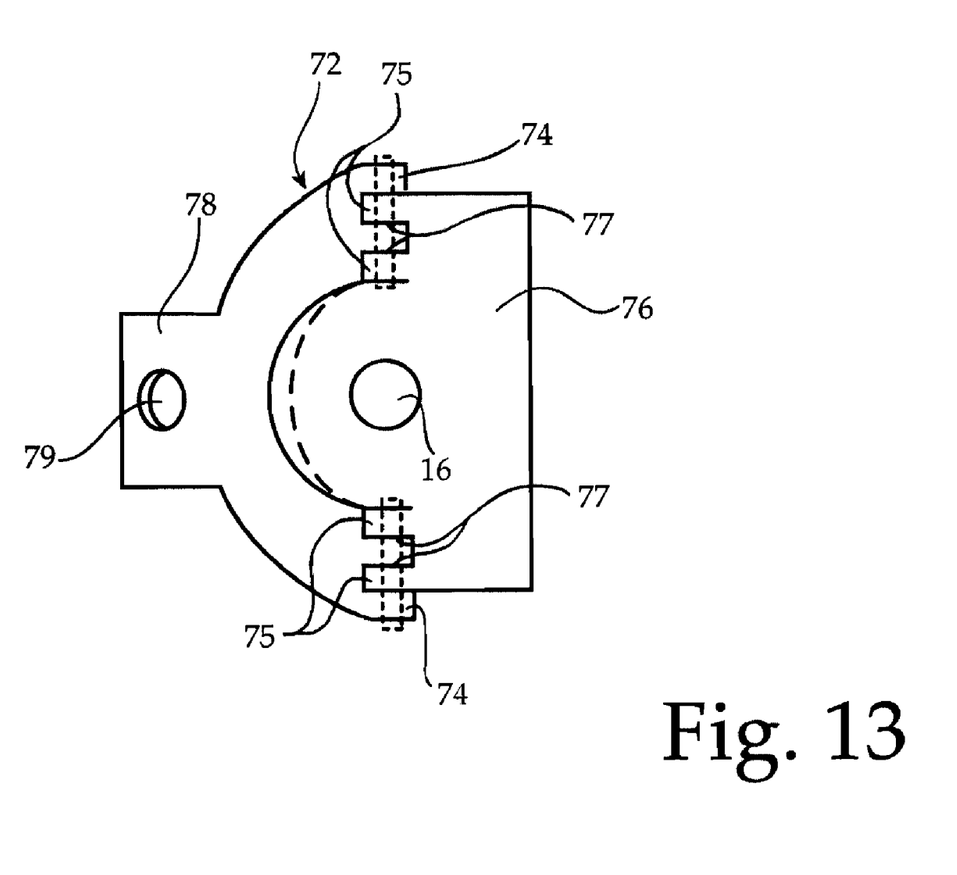
FIG. 13 is a top view of a restraint clip of a third embodiment.
Figure 14:
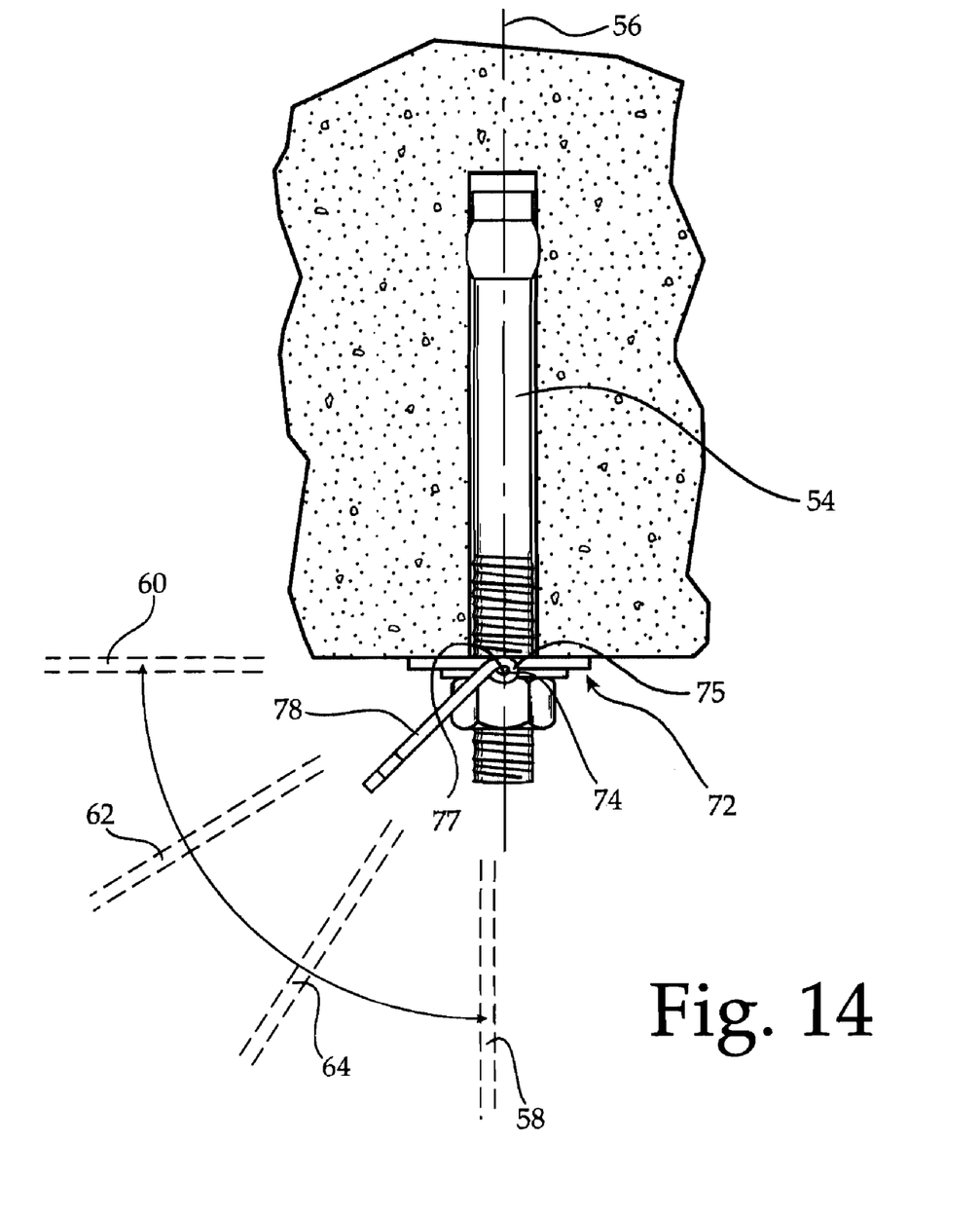
FIG. 14 illustrates an attachment at various angles to the concrete structure using the second alternative embodiment.

A restraint clip 72 of a third embodiment invention shown in FIGS. 13 and 14 includes an attachment flange 76. The restraint clip 72 further includes a rigid connection portion 75, which in this third embodiment comprises piano hinge fingers adapted to receive respective hinge pins 74. Termination or connection points 77 are located at bottoms of the hinge openings defined by the fingers 75 where the hinge pins contact the fingers to transmit the force from the bracing component to the attachment flange 76. The hinge pins 74 connect a pivoting connection portion 78 connected to attachment flange 76. Hole 79 in the pivoting connection portion 78 is provided so that an angle iron, channel type strut, pipe, etc. (not shown) could be attached with the prying effects of clip attachment 76 substantially reduced in the same way as for the first embodiment. More specifically, the connection points 77 are located to a second side of the restraint clip 72 of a plane that passes through the bolt hole 16. Stated another way, the axes of the hinge pins 74 generally extend through the longitudinal axis of the bolt 54, providing for the elimination of any prying effect on the bolt caused by application of force to the clip 72 through angle iron, channel type strut, pipe, etc.

In the illustrated embodiments of the invention the restraint clips provide a cable restraint apparatus or other sway brace apparatus that can be set at various degrees of brace angles and significantly reduce the prying effect on the apparatus due to tension forces. The illustrated embodiments also can be used for seismic braces that are attached to concrete or wood structures. In addition, these clips reduce the prying effect relative to the tension force so that a substantially greater load can be placed by the cable or other brace components without failure of the restraint clip or bolt. The illustrated embodiments further provide a cable restraint clip or other sway brace apparatus that can be made using the same standard manufacturing techniques used to make prior art restraint clips. (See FIG. 1). Finally, it is an aspect of the illustrated embodiments to provide a cable restraint clip or other sway brace apparatus that provides for attachment to the clip using techniques and methods well known in the art.

National Fire Protection Association (NFPA) Building Code Standard #13 specifies that an anchor (restrain clip) must hold a minimum allowable horizontal load at 45 degrees of 245 pounds when applied to a ½ inch diameter concrete anchor in 3000 pound lightweight concrete. The prior art clip 40' of FIGS. 15 and 16 is able to withstand a load of about 600 pounds at 45 degrees. The prior art clip 40 of FIGS. 1 and 2 is able to withstand a load of about 800 pounds at 45 degrees. The restrain clips 10, 66, 72 as illustrated in FIGS. 3-14 (and particularly the clip 10) are able to withstand a load of about 1300 pounds at 45 degrees, which is a significant improvement over the prior art.

Although the present restraint clip has been described with reference to certain preferred embodiments thereof, other versions are readily apparent to those of ordinary skill in the art of the preferred embodiments contained herein.

What is claimed is:

1. A restraint clip for use in connecting a seismic bracing component to a braced structure, the restraint clip comprising an attachment flange having a hole therein sized and shaped for receiving a fastener to attach the restraint clip to the braced structure, and a rigid connection portion having a semi-circular shaped channel recess adapted to receive the bracing component in the form of a cable wherein said rigid connection portion is integral with and formed as one piece with said attachment flange, said rigid connection portion for connecting the bracing component to the attachment flange, the rigid connection portion defining a termination point through which force from the bracing component is applied to the clip, the termination point being located so that the bracing component extends outwardly from the termination point toward a first side of the restraint clip, the termination point lying in or to a second side of the restraint clip opposite of the first side of a plane perpendicular to the attachment flange and intersecting the fastener hole, the rigid connection portion being free of any termination point lying to the first side of the plane.

2. A restraint clip as set forth in claim 1 wherein the plane intersects a center of the fastener hole.

3. A restraint clip as set forth in claim 1 wherein the rigid connection portion defines two termination points on opposite sides of the fastener opening.

4. A restraint clip as set forth in claim 3 wherein the channel recess opens and terminates at the termination point.

5. A restraint clip as set forth in claim 1 wherein said channel recess is divided into two, spaced apart sections.

6. A restraint clip as set forth in claim 5 wherein the two spaced apart sections of said channel recess are generally straight.

7. A restraint clip as set forth in claim 6 wherein the rigid connection portion defines two connection points.

8. A restraint clip as set forth in claim 7 further comprising hinge pins connecting the pivoting connection portion to the rigid connection portion.

9. A restraint clip as set forth in claim 1 further comprising a pivoting connection portion attached to the rigid connection portion generally at the termination point.

\* \* \* \* \*